(12) United States Patent
Lin

(10) Patent No.: US 9,290,237 B1
(45) Date of Patent: Mar. 22, 2016

(54) HYDROFOIL

(71) Applicant: Jian-Xing Lin, Changhua County (TW)

(72) Inventor: Jian-Xing Lin, Changhua County (TW)

( * ) Notice: Subject to any disclaimer, the term of this patent is extended or adjusted under 35 U.S.C. 154(b) by 0 days.

(21) Appl. No.: 14/522,589

(22) Filed: Oct. 24, 2014

(51) Int. Cl.
*B63B 1/24* (2006.01)
*B63H 7/02* (2006.01)
*B63B 1/26* (2006.01)
*B63B 1/32* (2006.01)
*B63H 5/08* (2006.01)

(52) U.S. Cl.
CPC . *B63B 1/248* (2013.01); *B63B 1/26* (2013.01); *B63B 1/322* (2013.01); *B63H 5/08* (2013.01); *B63H 7/02* (2013.01)

(58) Field of Classification Search
CPC ............ B63B 1/322; B63B 1/248; B63B 1/26
USPC ............ 440/37; 114/261, 262, 292, 274, 278; 244/101
See application file for complete search history.

(56) References Cited

U.S. PATENT DOCUMENTS

| | | | | |
|---|---|---|---|---|
| 2,914,014 A * | 11/1959 | Carl | ............ | B63B 1/30 114/281 |
| 3,139,059 A * | 6/1964 | Hanford, Jr. | ............ | B63B 1/286 114/273 |
| 3,965,836 A * | 6/1976 | Malvestuto, Jr. | ........ | B60V 1/22 114/272 |
| 5,503,100 A * | 4/1996 | Shaw | ......... | B63B 1/24 114/271 |
| 5,544,607 A * | 8/1996 | Rorabaugh | ............. | B60F 3/003 114/123 |
| 6,073,568 A * | 6/2000 | Finley | ...................... | B63B 43/14 114/123 |
| 7,967,246 B2 * | 6/2011 | Chan | ......... | B60V 1/08 244/100 A |
| 8,671,868 B2 * | 3/2014 | Shifferaw | ............... | B63G 8/04 114/357 |
| 8,857,365 B2 * | 10/2014 | Sancoff | .................... | B63B 1/107 114/20.1 |
| 9,045,226 B2 * | 6/2015 | Piasecki | .................. | G05D 1/102 |
| 2006/0196403 A1 * | 9/2006 | Watts | ..................... | B63B 1/322 114/272 |
| 2009/0008499 A1 * | 1/2009 | Shaw | ..................... | B64C 27/20 244/17.23 |
| 2010/0044506 A1 * | 2/2010 | Smith | .................... | B64C 25/10 244/101 |
| 2012/0248241 A1 * | 10/2012 | Goelet | ..................... | B64B 1/06 244/30 |

FOREIGN PATENT DOCUMENTS

TW    I308545 B    4/2009

* cited by examiner

*Primary Examiner* — Lars A Olson
*Assistant Examiner* — Jovon Hayes
(74) *Attorney, Agent, or Firm* — Bruce Stone LLP; Joseph A. Bruce

(57) ABSTRACT

A hydrofoil includes a body, an even number of wings disposed at the opposite sides of the body and an even number of floats disposed at both sides of a bottom of the body. Each float is a hollow and flat structure. At a rear edge of the float portion is provided a float propeller. With the design of the float structure, the counterforce caused by the water waves impacting on the floats can be reduced, so that the float can move more stably to improve safety and comfortableness.

12 Claims, 15 Drawing Sheets

HYDROFOIL

BACKGROUND OF THE INVENTION

1. Field of the Invention

The present invention relates to a hydrofoil, and more particularly to a hydrofoil which can fly in water stably via a float structure.

2. Description of the Prior Art

Hydrofoil is a high-speed boat that is provided with a frame at a bottom for assembling wings. When the speed of the boat increases, the wings can provide buoyant force to lift the boat out of the water, forming the so-called hydrofoil flight or navigation, thus largely reducing drag in the water and increasing the navigation speed.

Referring to FIGS. 1 and 2, a conventional hydrofoil 10 comprises a body 11, both sides of the body 11 are provided with the same number of wings 12 having propellers 121 at a rear edge thereof, and at a bottom of the body 11 is provided a float device 13 having a plurality of elongated first floats 131. Both ends of each first float 131 are provided with propellers 135, and a sheet-shaped connecting portion 132 is extended from the first float 131 to connect the first float 131 to the bottom of the body 11. The float device 13 is further provided with two second floats 133 located at both sides of the body 11 and adjacent to the bottom of the body 11, and the second floats 133 are connected to the body 11 via two bent connecting portions 134. Therefore, as shown in FIG. 2, when the hydrofoil 10 stops moving, the first floats 131 are submerged under the surface of the water completely, and the second floats 133 are floated on the surface of the water, so as to make the body 11 float on the surface of the water. When the hydrofoil 10 flies on the surface of the water, the connecting portions 132 of the first floats 131 and the second floats 133 will be lifted completely from the surface of the water to make the hydrofoil 10 fly stably above the water.

However, since the floats of the float device 13 of the hydrofoil 10 are elongated and are extended from the body 11, no matter the hydrofoil 10 is moving or not, the waves coming from both sides of the body 11 will impact on the first floats 131 or the second floats 133, causing instability of the body 11. Especially, as compared with the cylindrical floats which can shunt the waves slightly, when the hydrofoil 10 moves fast, the water waves coming from both sides of the body 11 will impact on the connecting portions 132 of the first floats 131 to further cause instability of the body 11. Therefore, such a conventional hydrofoil 10 is unstable and uncomfortable.

Therefore, maintaining the hydrofoil 10 always in the horizontal position is extremely difficult. The floats have to be connected to the body 11 via the connecting portions 132, then with the aid of the wings 12, the hydrofoil 10 is able to keep staying in the horizontal state. However, when the wings encounter turbulent flow, the first floats 13 will move up and down along with the hydrofoil 10, the periphery of the first floats 131 changes from the state of being stressed uniformly to a surface contact in a single direction, which is likely to cause expected path change after the floats are struck by high speed water flow. More particularly, the reaction force of water is much bigger than that of airflow. Hence, the faster the speed or the larger the angle changed, the resultant impact will become more obvious, the hydrofoil 10 will jump up and down in a rapid manner, making the sailing very unstable.

The present invention has arisen to mitigate and/or obviate the afore-described disadvantages.

SUMMARY OF THE INVENTION

The primary objective of the present invention is to provide a hydrofoil comprises a body, an even number of wings disposed at two opposite sides of the body and an even number of floats disposed at both sides of a bottom of the body. Each float includes a circular float portion and a connecting portion connected to the bottom of the body. At a rear edge of the float portion is provided a float propeller. With the design of the float structure, the counterforce caused by the water waves impacting on the floats 30 can be reduced, so that the float can move more stably to improve Safety and comfortableness.

To achieve the above objective, a hydrofoil in accordance with the present invention comprises a body including a front end and a rear end opposite the front end, the front end being connected to the rear end via a bottom; an even number of hollow and flat floats being disposed in pairs at the bottom of the body, each of the floats including an inner surface and an outer surface which are located toward two sides of the body, and a front edge, a lower edge and a rear edge between the inner and outer surfaces, a float propeller being disposed at the rear edge of the float to provide propulsive force in water; and an even number of wings being disposed in pairs at both sides of the body and each including at least one wing propeller to produce a propulsive force in the air.

Preferably, each of the floats has a front edge, a lower edge, a rear edge, an inner surface and an outer surface which define a connecting portion fixed to the bottom of the body, and define a circular float portion, The float portion has a center, the connecting portion is extended towards the bottom of the body along the center and is inclined towards the rear end of the body. The connecting portion is perpendicular to the bottom of the body or can be inclined toward the rear edge of the body, so as to further reduce the drag produced by the floats. The float propeller has a shaft, and at the rear edge of the float is provided an assembling seat which is located at a position where a tangent line perpendicular to the bottom of the body touches the arch-shaped section, and the shaft of the float propeller is connected to the assembling seat and parallel to the bottom.

Preferably, the front and rear edges of each of the floats are flat and straight, and the lower edge is inclined and extends downward from the front edge toward the rear edge, so as to reduce the resistance generated by the floats moving in water. The front edge of each of the floats has a V-shaped cross section, so that the sharp front edge further reduces the water drag.

Preferably, the wings can be sheet-shaped or wheel-shaped, and can be rotated to adjust the angle of deflection, so as to make the float fly with the bottom lifted at a predetermined height from the water.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
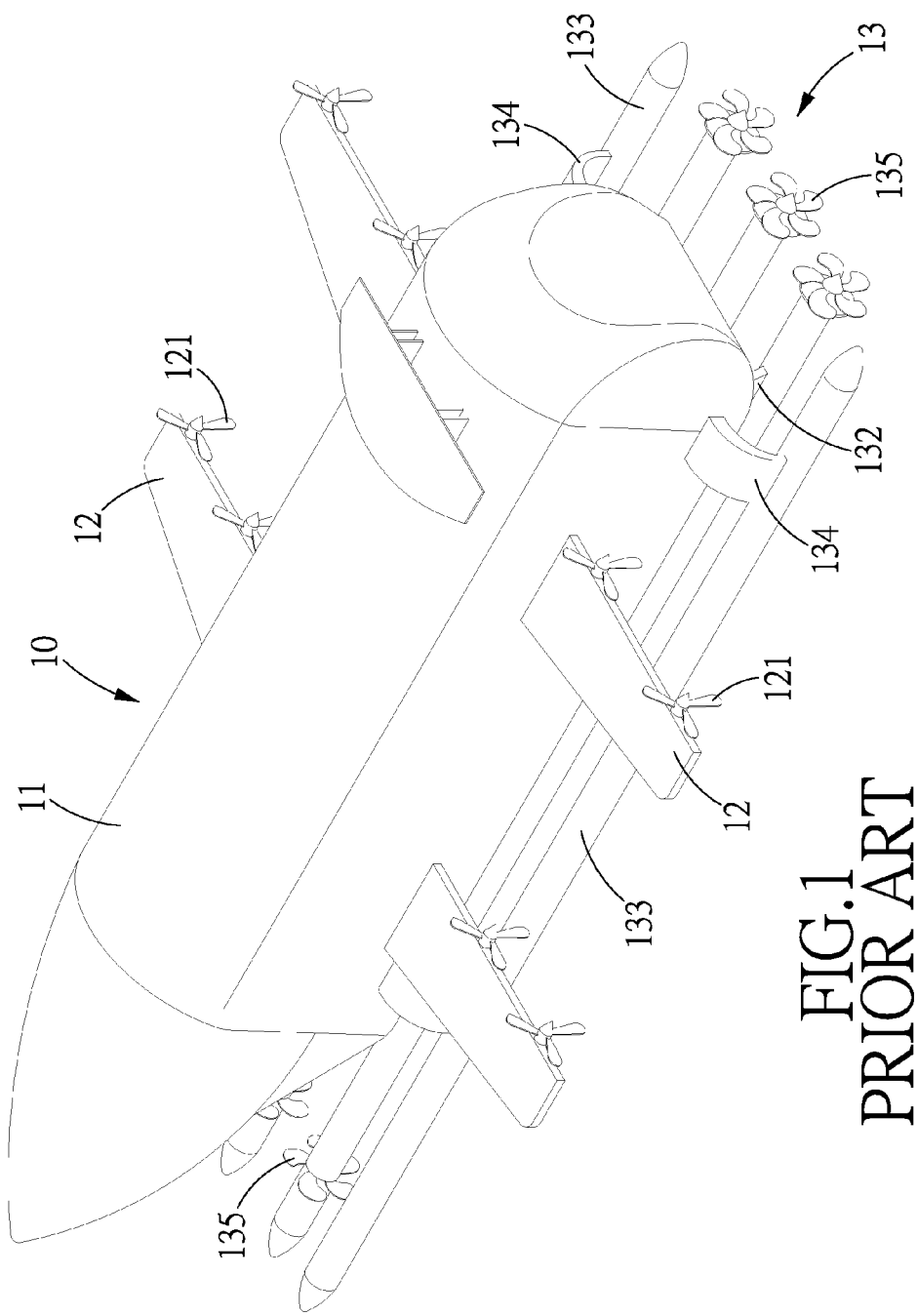
FIG. 1 is a perspective view of a conventional hydrofoil.
Figure 2:
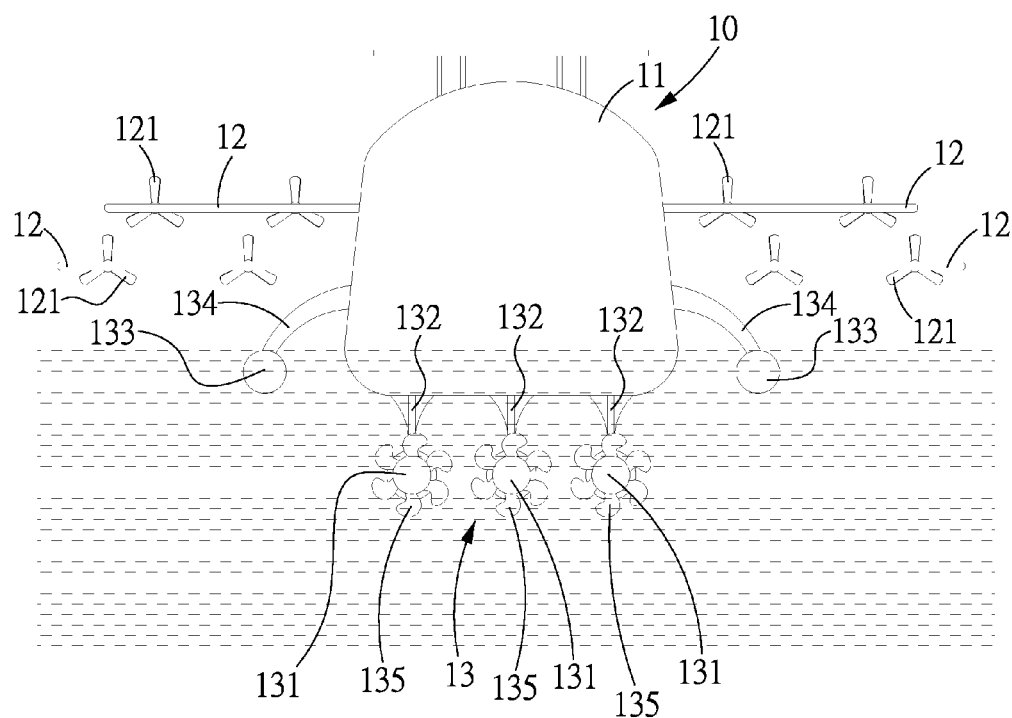
FIG. 2 is a front view showing a conventional hydrofoil being anchored on the surface of the water.

Referring to FIGS. 3-9, a hydrofoil in accordance with the present invention comprises a body 20, an even number of floats 30 disposed at both sides of a bottom 23 of the body 20 and a same even number of wings 40 disposed at the opposite sides of the body 20.

The body 20 includes a front end 21 and a rear end 22 opposite the front end 21, and the front end 21 is connected to the rear end 22 via the bottom 23. The body 20 can be a predetermined shape with an inside space for sitting or transportation. The bottom 23 of the body 20 comes slightly into contact with the water when the hydrofoil is in the stationary state, and can be lifted at a predetermined height from the water when the hydrofoil flies or moves.

Figure 4:
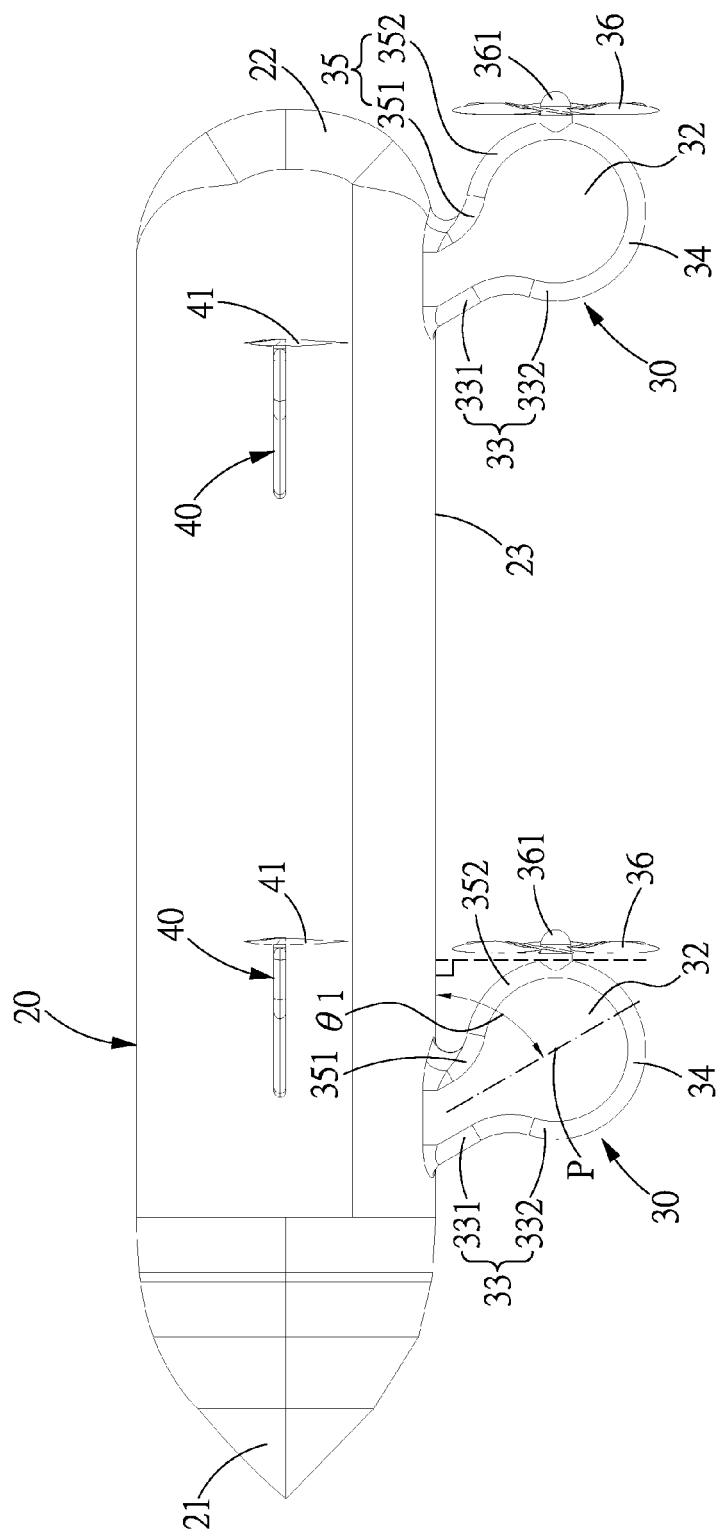
FIG. 4 is a side view of the hydrofoil in accordance with the first embodiment of present invention.
Figure 6:
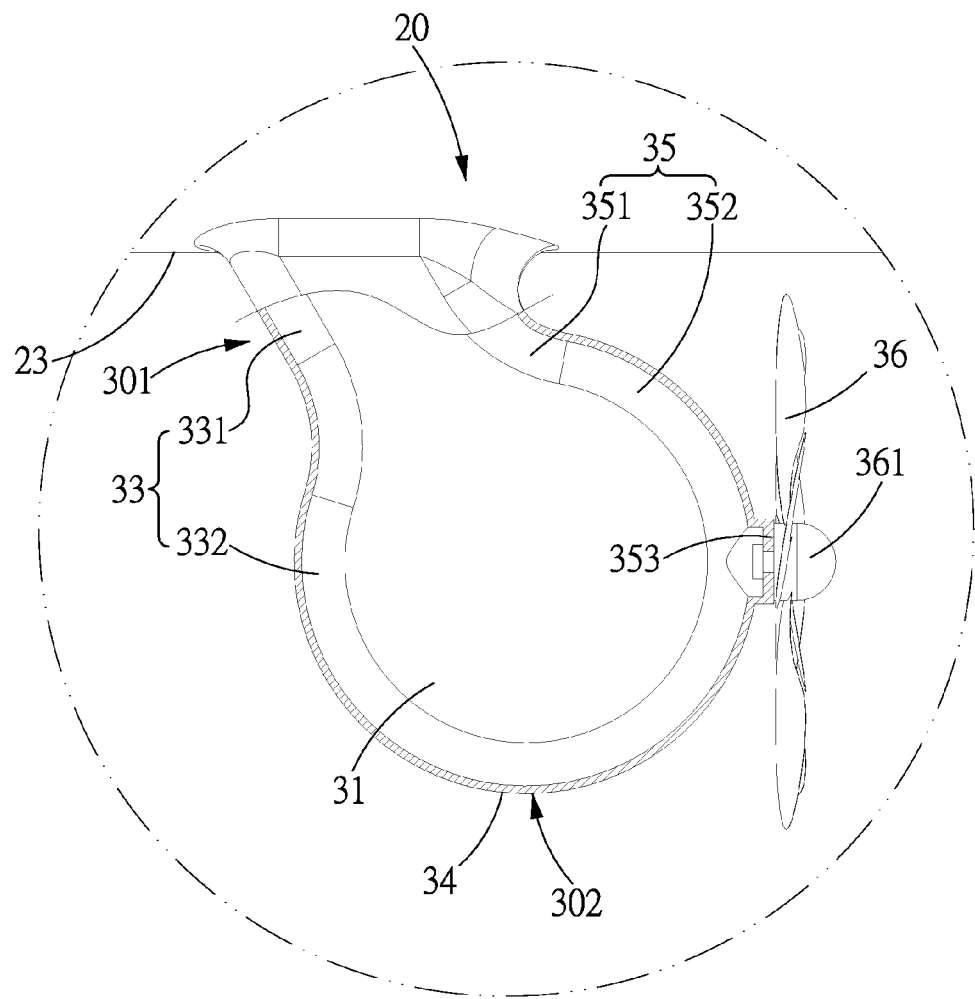
FIG. 6 is a cross sectional view showing a first embodiment of a float structure of the hydrofoil in accordance with the present invention.
Figure 7:
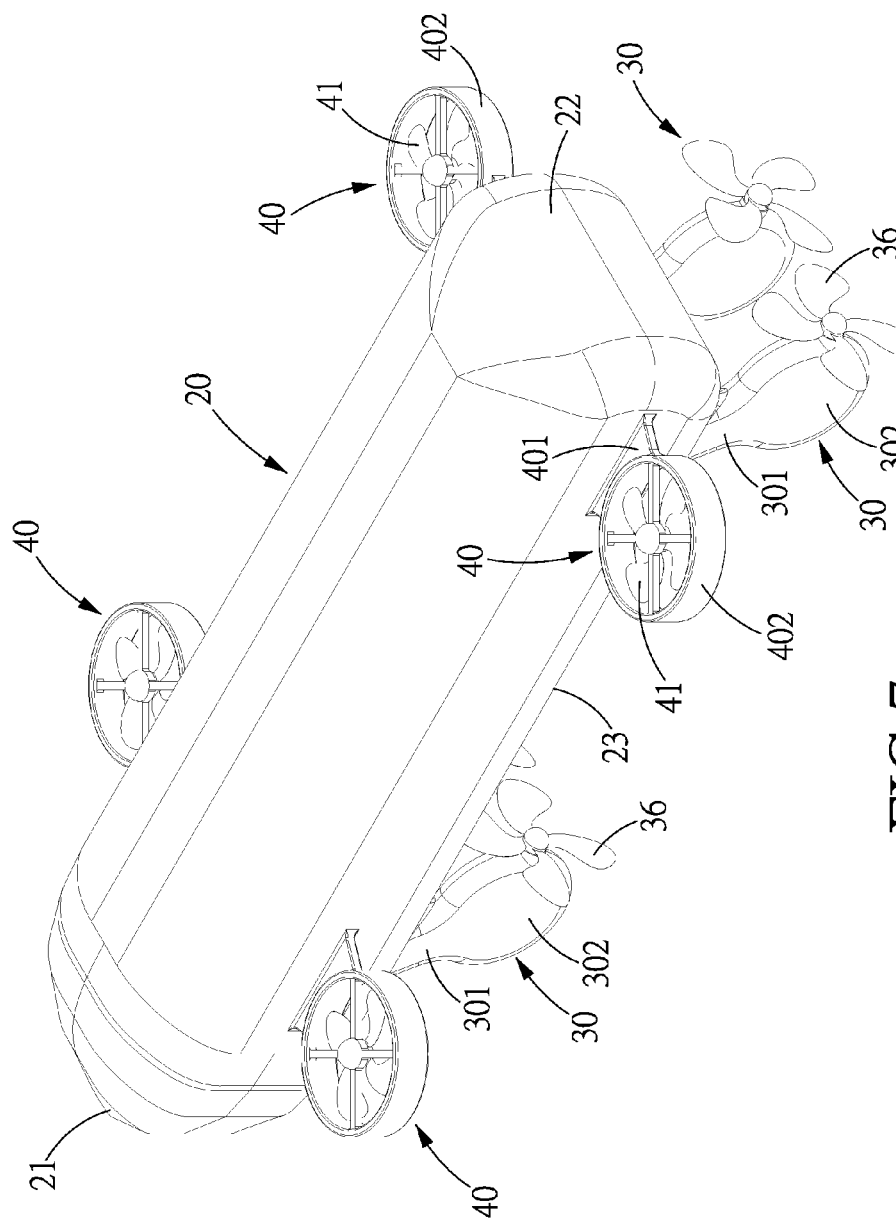
FIG. 7 is a perspective view showing another embodiment of the wings of the hydrofoil in accordance with the present invention.
Figure 8:
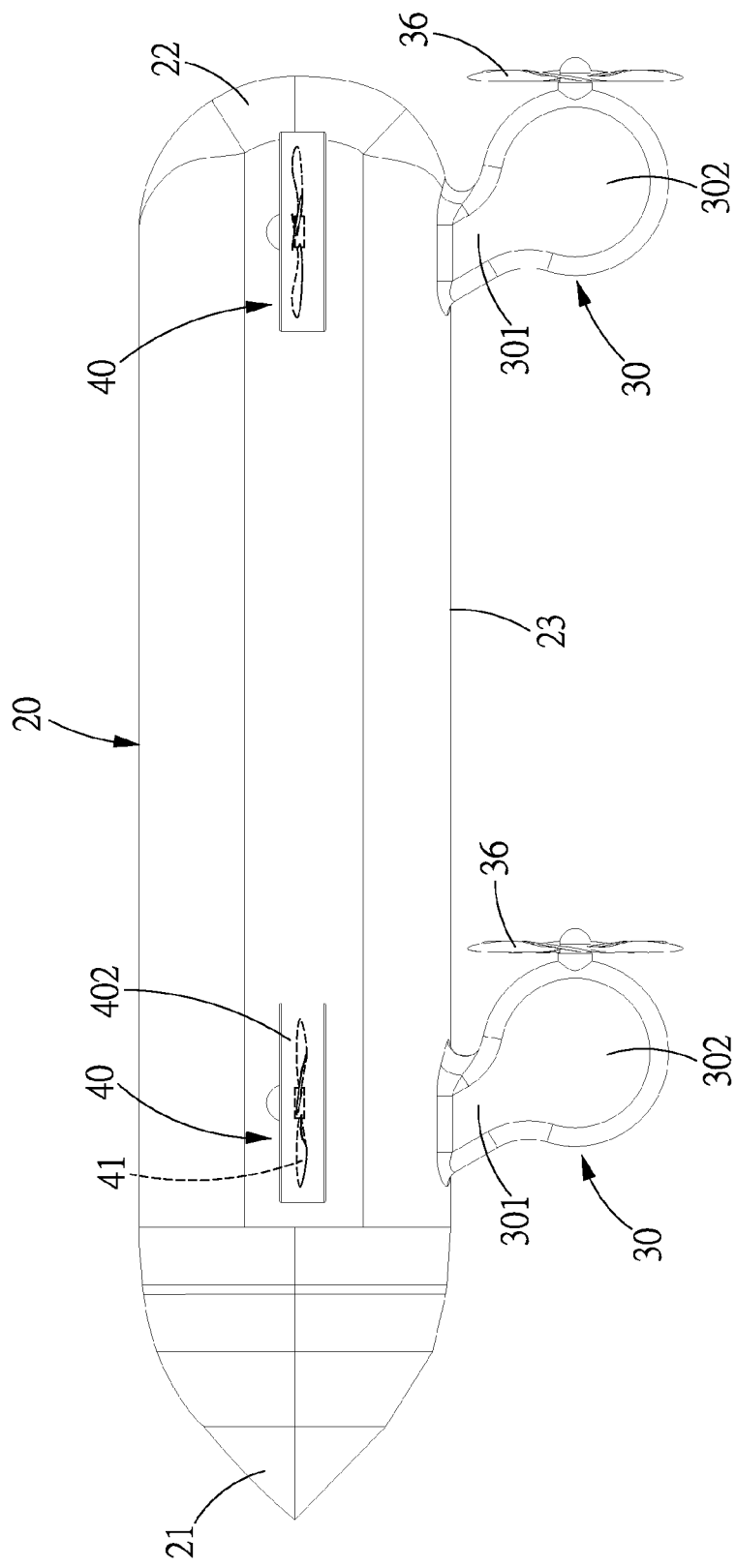
FIG. 8 is a side view showing the another embodiment of the wings of the hydrofoil in accordance with the present invention.
Figure 9:
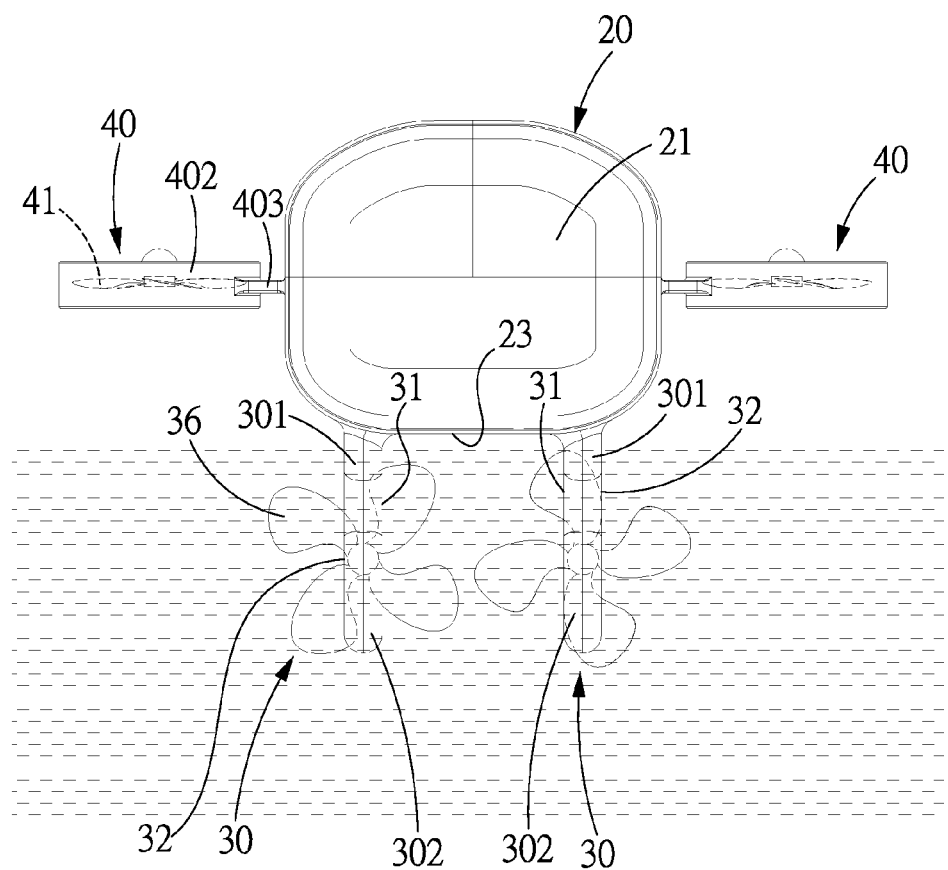
FIG. 9 is a front view showing the another embodiment of the wings of the hydrofoil in accordance with the present invention.

The floats 30 are disposed in pairs at the bottom 23 of the body 20, the number of the floats 30 in the present embodiment is four, and each of the floats 30 is provided with a float propeller 36. The number of the floats 30 and the float propellers 36 can be increased or reduced according to specific requirements. Referring to FIGS. 4 and 6, each float 30 is a hollow and flat structure and disposed at the bottom 23 of the body 20 in a manner that the peripheral edge of the flat float 30 is located toward the front and rear ends 21, 22 of the body 20, which not only provides buoyancy but also reduces resistance. Each of the floats 30 further includes an inner surface 31 and an outer surface 32 which are located toward two sides of the body 20, and a front edge 33, a lower edge 34 and a rear edge 35 between the inner and outer surfaces 31, 32. The float propeller 36 is disposed at the rear edge 35 of the float 30 to provide propulsive force.

Figure 5:
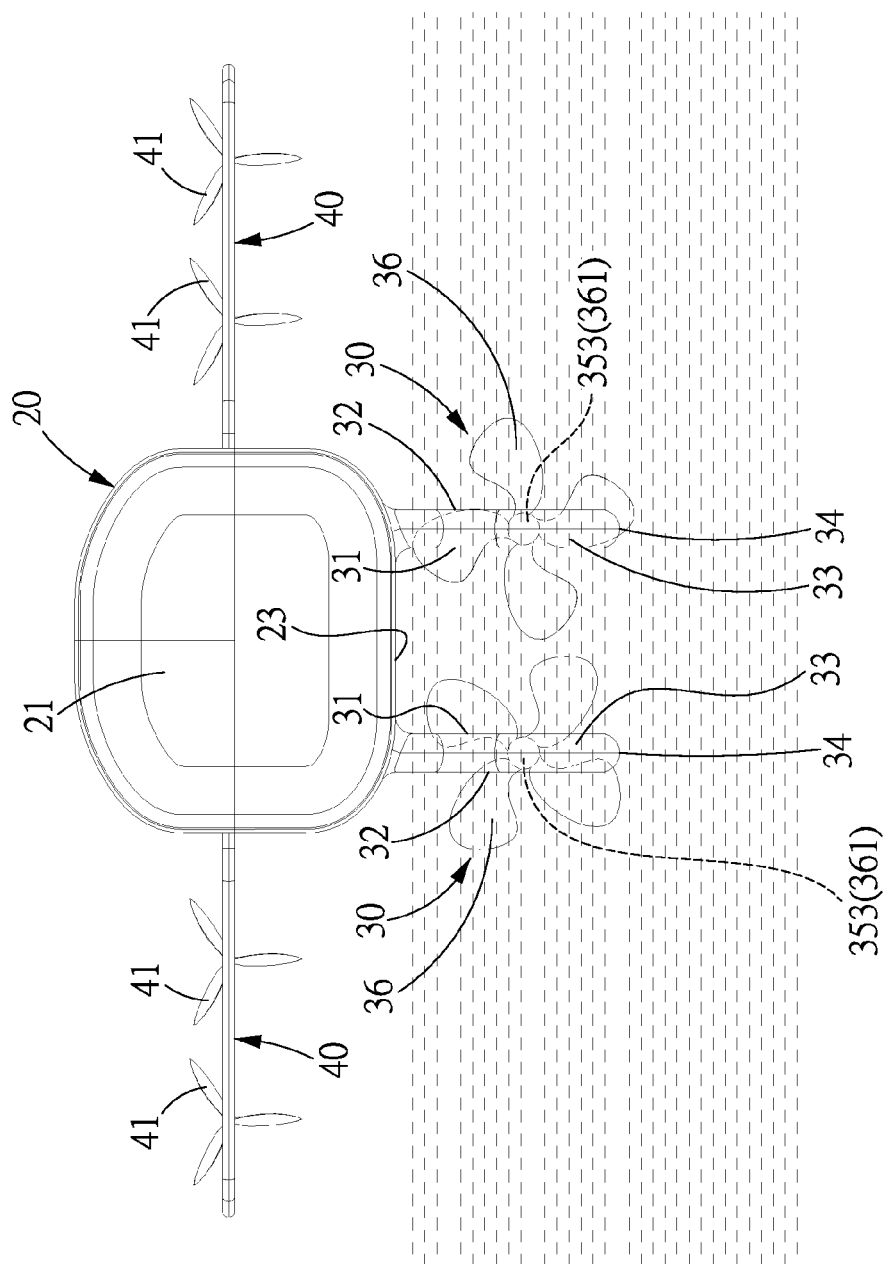
FIG. 5 is a front view showing the hydrofoil in accordance with the first embodiment of the present invention being anchored on the surface of the water.

In this embodiment, the front edge 33, the lower edge 34 and the rear edge 35 of each of the floats 30 are arc-shaped in cross section, and both ends of the arc-shaped cross section of the front, lower and rear edges 33, 34, 35 are connected to the inner and outer surfaces 31, 32. The front and rear edges 33, 35 each have a straight and flat section 331, 351 and an arc-shaped section 332, 352. The lower edge 34 is arc-shaped and has two ends connected to the arc-shaped sections 332, 352 of the front and rear edges 33, 35. The straight and flat sections 331, 351 and the inner and outer surfaces 31, 32 define a connecting portion 301 which is fixed to the bottom 23 of the body 20. The two arc-shaped sections 332, 352, the lower edge 34 and the inner and outer surfaces 31, 32 define a circular float portion 302. The float propeller 36 is located at the arc-shaped section 352 of the rear edge 35. As shown in FIG. 5, when the float 30 is in a stationary state, the connecting portion 301 is almost fully located below the surface of the water. When the float 30 flies, the float portion 302 is located below the surface of the water, and the connecting portion 301 is located above the surface of the water.

The float propeller 36 has an shaft 361, and at the rear edge 35 of the float 30 is provided an assembling seat 353 which is located at a position where a tangent line perpendicular to the bottom 23 of the body 20 touches the arch-shaped section 352, and the shaft 361 of the float propeller 36 is connected to the assembling seat 353 and parallel to the bottom 23.

In addition, as shown in FIG. 4, the float portion 302 of the float 30 has a center P, the connecting portion 301 is extended towards the bottom 23 of the body 20 along the center P and is inclined towards the rear end 22 of the body 20, and between the connecting portion 301 and the bottom 23 is defined an angle $\theta$ ranging from 40 to 90 degrees ($40° < \theta < 90°$).

Figure 3:
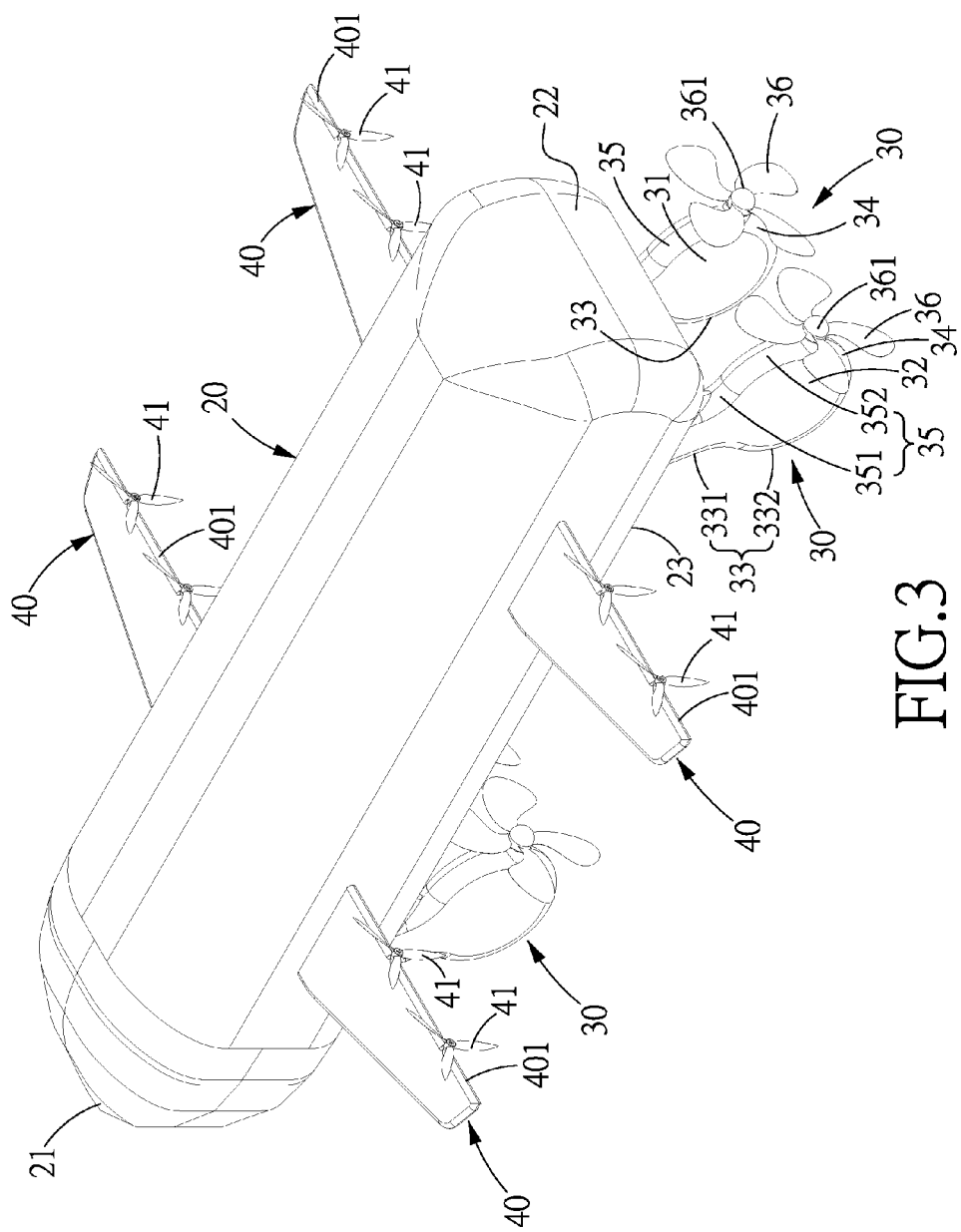
FIG. 3 is a perspective view of a hydrofoil in accordance with a first embodiment of the present invention.

The wings 40 are disposed in pairs at both sides of the body 20 and each provided with at least one wing propeller 41. In the present embodiment, the number of the wings 40 is four, and each wing 40 is provided with two wing propellers 41 to produce a propulsive force in the air. The number of the wings 40 and the wing propellers 41 can be increased or reduced according to specific requirements. Referring to FIGS. 3-5, each of the wings 40 is sheet-shaped and includes a lateral edge 401 located towards the rear end 22 of the body 20, and the wing propellers 41 are disposed at the lateral edge 401. Further referring to FIGS. 7-9, the wing 40 can be wheel-shaped and includes a rim portion 402 and an assembling portion 403 for connecting the rim portion 402 to the body 20, and the wing propellers 41 are disposed in the rim portion 402, such that the wing 40 can be rotated to adjust the angle of deflection, so as to make the float 20 fly with the bottom 23 lifted at a predetermined height from the water.

For a better understanding of the present invention, its operations and functions, reference should be made to FIGS. 4-5.

Referring to FIG. 5, when the hydrofoil is in the stationary state, the buoyant force of the floats 30 makes the bottom 23 of the body 20 come slightly into contact with the water, such that the float portions 31 will sink completely in the water, and only the joints of the connecting portions 301 and the body 20 are located above or near the surface of the water. Meanwhile, the wings 40 which are extended from both sides of the body 20 are generally in a horizontal state. When the float and wing propellers 36, 41 of the floats 30 and the wings 40 rotate, the body 20 can be moved forward by the propulsive force generated by the float and wing propellers 36, 41 with respect to the water and air. At this moment, the wings 40 can be rotated to adjust the angle of deflection, which can produce a force for lifting the body 20, plus the dynamic airflow generated by the bottom 23 of the body 20 with respect to the surface of the water, the body 20 will be lifted completely above the water, make the float 30 fly stably above the water.

To summarize, the floats 30 of the present invention are connected to the body 20 via the connecting portions 301, such that when the hydrofoil flies, water waves coming form both sides of the body 20 will only come into contact with the connecting portions 301 of the floats 30, which largely reduces the contact area of the waves and the floats 30. Namely, the counterforce caused by the water waves impacting on the floats 30 will be reduced, so that the float can move more stably to improve Safety and comfortableness.

In addition to the shape and structure as shown in FIG. 3-9, the float 30 of the hydrofoil of the present invention can also have other embodiments, like the second to sixth embodiments as shown in FIGS. 10-15.

Figure 10:
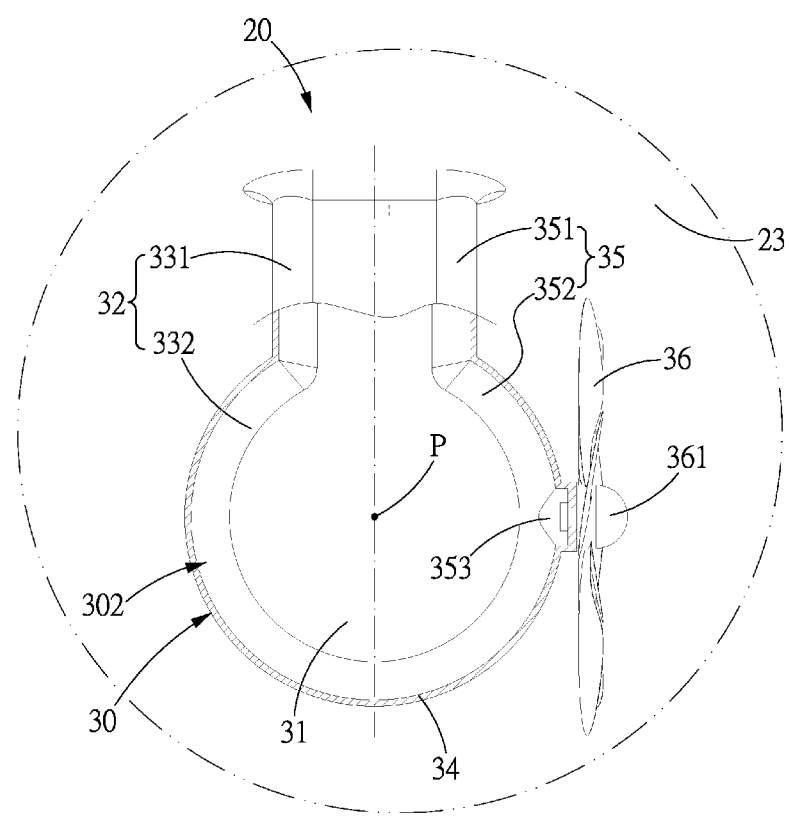
FIG. 10 is a cross sectional view showing a second embodiment of the float of the hydrofoil in accordance with the present invention.

As shown in FIG. 10, which show a second embodiment of the floats 30 of the present invention, wherein the circular flat float portion 302 of each of the floats 30 has a center P, and the connecting portion 301 extends through the center P and perpendicularly towards the bottom 23 of the body 20, so that each of the floats 30 is connected to the bottom 23 of the body 20 in a perpendicular manner, namely, an angle θ1 between the connecting portion 301 and the bottom 23 of the boat 20 is or close to 90 degrees.

Figure 11:
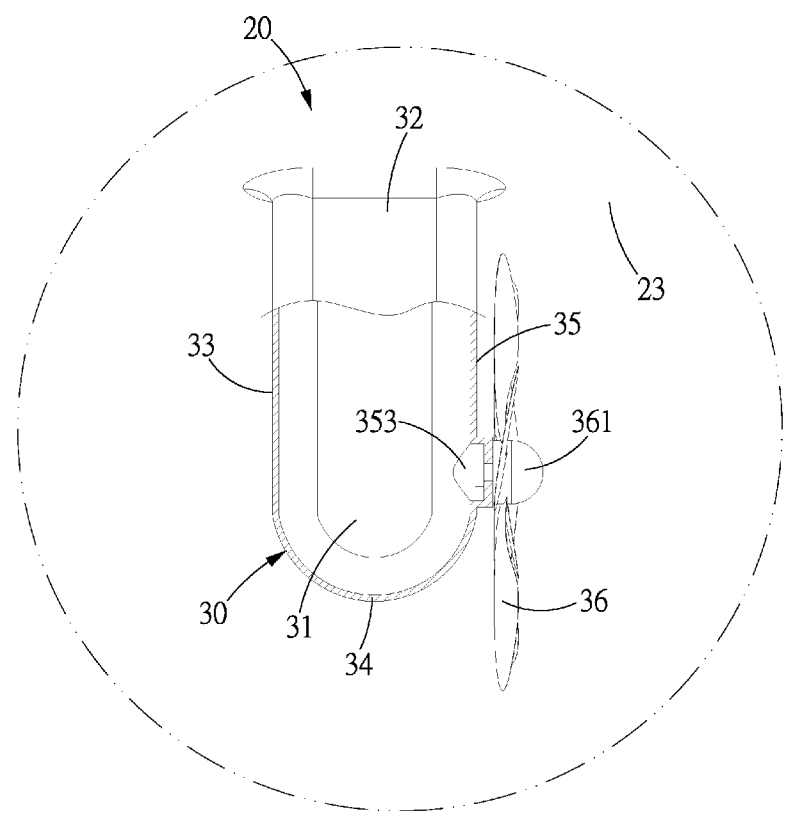
FIG. 11 is a cross sectional view showing a third embodiment of the float of the hydrofoil in accordance with the present invention.

As shown in FIG. 11, which show a third embodiment of the floats 30 of the present invention, wherein the front, lower and rear edges 33, 34, 35 of each of the floats 30 are arcs-shaped in cross section, and both ends of the arc-shaped cross section of the front, lower and rear edges 33, 34, 35 are connected to the inner and outer surfaces 31, 32. The front and rear edges 33, 35 are straight and flat and perpendicular to the bottom 23 of the body 20, and the lower edge 34 are arc-shaped, which reduces the resistance generated when the floats 30 move in water.

Figure 12:
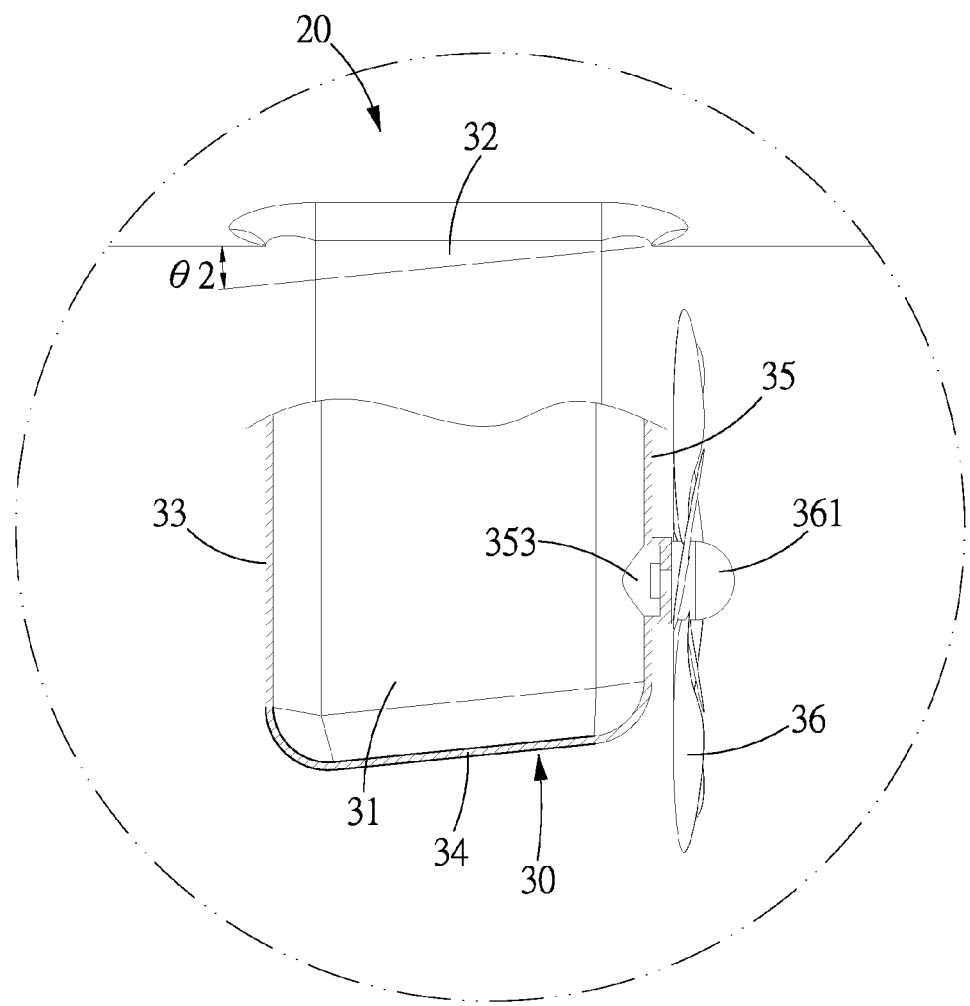
FIG. 12 is a cross sectional view showing a fourth embodiment of the float of the hydrofoil in accordance with the present invention.
Figure 13:
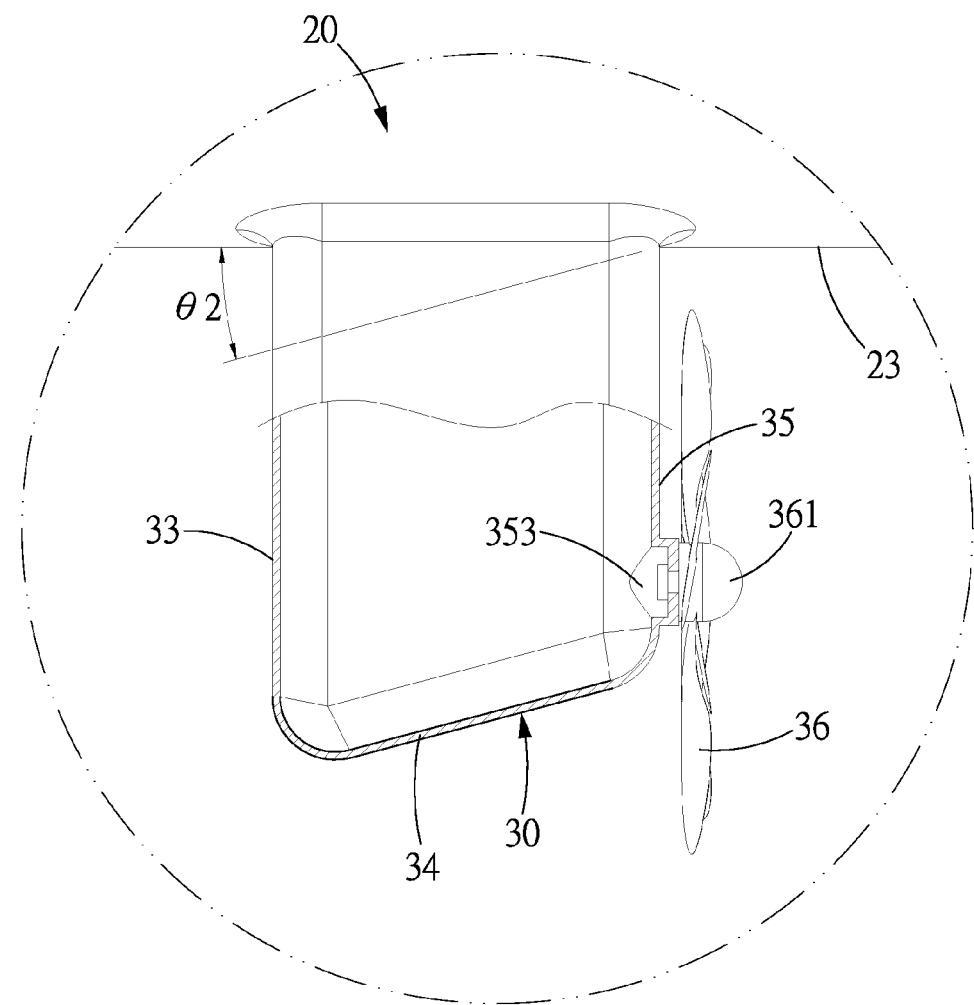
FIG. 13 is a cross sectional view showing a fifth embodiment of the float of the hydrofoil in accordance with the present invention.

As shown in FIGS. 12 and 13, which show a fourth and a fifth embodiments of the floats 30 of the present invention, wherein the front, lower and rear edges 33, 34, 35 of each of the floats 30 are arcs-shaped in cross section, and both ends of the arc-shaped cross section of the front, lower and rear edges 33, 34, 35 are connected to the inner and outer surfaces 31, 32. The front and rear edges 33, 35 are straight and flat and perpendicular to the bottom 23 of the body 20. The lower edge 34 is inclined and extends downward from the front edge 33 toward the rear edge 35, and an angle θ2 between the lower edge 34 and the bottom 23 of the boat 20 ranges from 10-30 degrees and is larger than 10 degrees but smaller than 30 degrees. FIG. 12 shows a fourth embodiment of the floats of the present invention, wherein the angle θ2 is relatively small, while FIG. 13 shows a fifth embodiment of the floats of the present invention, wherein the angle θ2 is relatively big.

Figure 14:
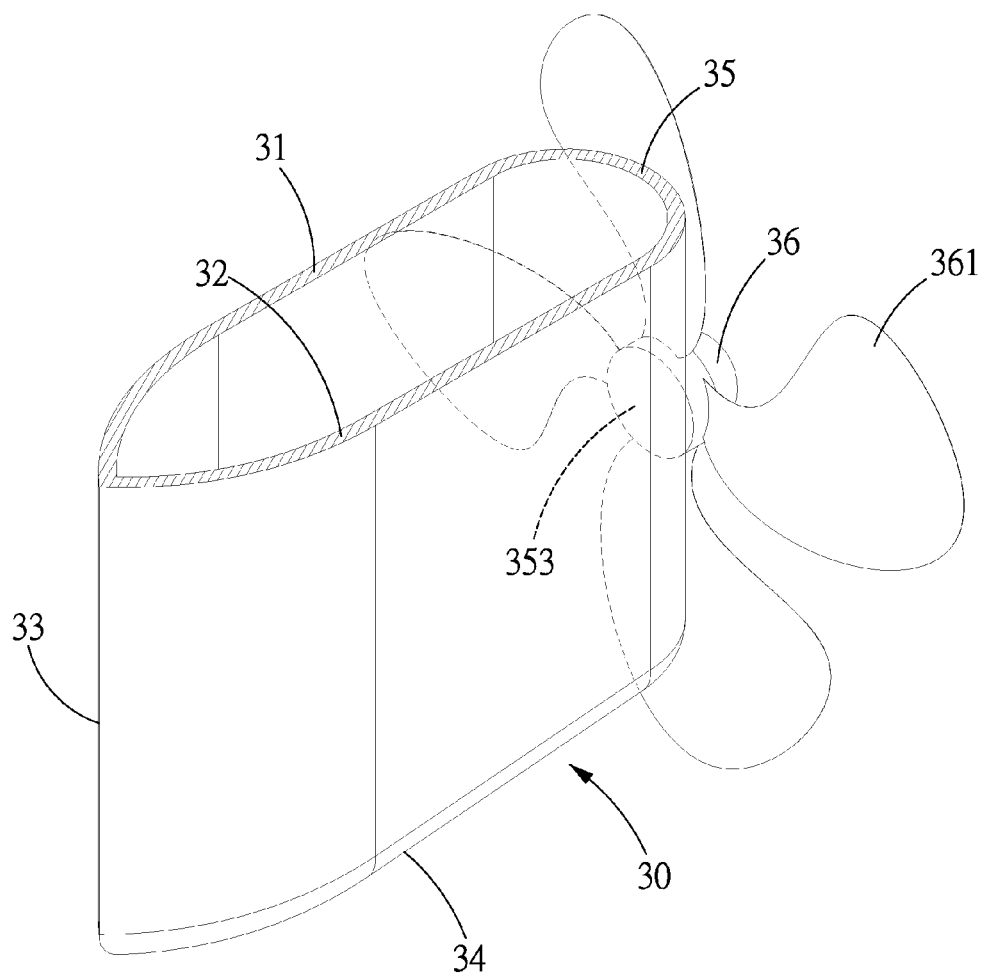
FIG. 14 is a perspective view showing a sixth embodiment of the float of the hydrofoil in accordance with the present invention.
Figure 15:
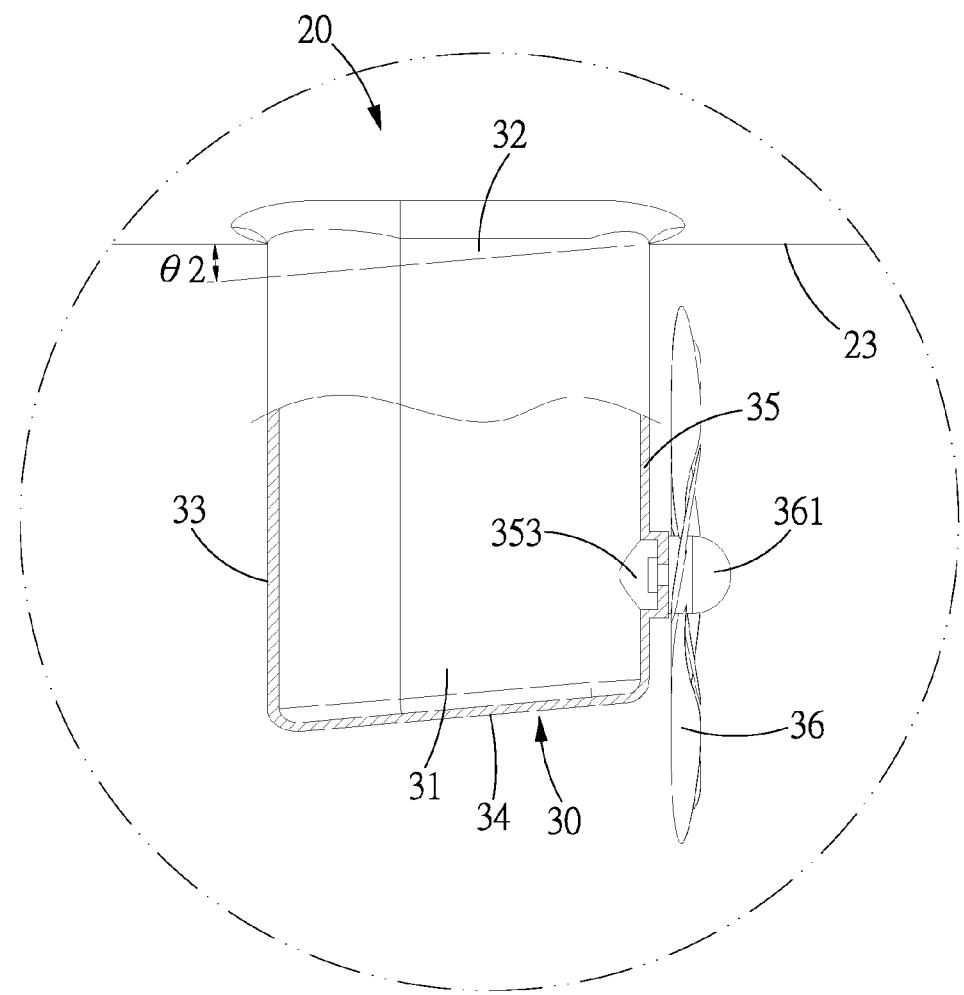
FIG. 15 is a cross sectional view showing the sixth embodiment of the float of the hydrofoil in accordance with the present invention.

As shown in FIGS. 14 and 15, which show a sixth embodiment of the floats 30 of the present invention, wherein the front edge 33 of each of the floats 30 has a V-shaped cross section, while the lower and rear edges 34, 35 are arc-shaped in cross section to connect the inner and outer surfaces 31, 32. The lower edge 34 is inclined and extends downward from the front edge 33 toward the rear edge 35, and an angle θ2 between the lower edge 34 and the bottom 23 of the boat 20 ranges from 10-30 degrees and is larger than 10 degrees but smaller than 30 degrees.

In the second-sixth embodiments, the float propeller 36 of each of the floats 30 includes a shaft 361, and at the rear edge 35 of the float 30 is provided an assembling seat 353 which is located adjacent to the lower edge 34. The shaft 361 of the float propeller 36 is connected to the assembling seat 353 and parallel to the bottom 23.

It is to be noted that the bottom of the floats of the hydrofoil in accordance with the first, second and third embodiments of the present invention is formed in a circular or U shape, so that the hydrofoil has an arc-shaped lower half portion. When the body 20 of the hydrofoil starts to move and the speed increases gradually, the arc-shaped lower half portion will be pushed upward by component of force of the water flow. The faster the speed, or the bigger the force of component or the bigger the cross sectional area of the upward component force, the force for pushing the hydrofoil upward will become more larger. Namely, when the body 20 is pushed up more high, with the shunting effect caused by the arc-shaped bottom, the body 20 of the hydrofoil will sway to change the force angle, so that the hydrofoil will still be stressed uniformly, without the problem that the hydrofoil will get bumpy when being stressed in a non-uniform manner.

On the other hand, the bottom of the floats of the hydrofoil in accordance with the fourth, fifth and sixth embodiments of the present invention is formed in a slanting manner. In addition to the small component force of the front round angle, the low front high back slanting structure can guide water flow, so that the speed change of the body 20 won't affect the change of the upward component force, the height of the body 20 also changes a little. Furthermore, when the body 20 sways and change directions after being subjected to a force, the component won't change unless the angle of sway is larger than the slanting angle, allowing the body 20 to sail smoothly.

While we have shown and described various embodiments in accordance with the present invention, it should be clear to those skilled in the art that further embodiments may be made without departing from the scope of the present invention.

What is claimed is:

1. A hydrofoil comprising:
   a body including a front end and a rear end opposite the front end, the front end being connected to the rear end via a bottom;
   an even number of hollow and flat floats being disposed in pairs at the bottom of the body, each of the floats including an inner surface and an outer surface which are located toward two sides of the body, and a front edge, a lower edge and a rear edge between the inner and outer surfaces, a float propeller being disposed at the rear edge of the each of the floats to provide propulsive force in water; and
   an even number of wings being disposed in pairs at both sides of the body and each including at least one wing propeller to produce a propulsive force in the air;
   wherein a maximum distance between the lower edge of each of the floats and the bottom of the body is larger than a maximum distance between the front edge and the rear edge of each of the floats.

2. The hydrofoil as claimed in claim 1, wherein the front edge, the lower edge and the rear edge of each of the floats are arc-shaped in cross section, and both ends of the arc-shaped cross section of the front, lower and rear edges are connected to the inner and outer surfaces of the body, the front and rear edges each have a straight and flat section and an arc-shaped section, the lower edge is arc-shaped, the straight and flat sections and the inner and outer surfaces define a connecting portion which is fixed to the bottom of the body, the two arc-shaped sections, the lower edge and the inner and outer surfaces define a circular float portion, and the float propeller is located at the arc-shaped section of the rear edge.

3. The hydrofoil as claimed in claim 2, wherein the circular float portion of each of the floats has a center, the connecting portion is extended towards the bottom of the body along the center and is inclined towards the rear end of the body, and between the connecting portion and the bottom is defined an angle between 90 and 40 degrees.

4. The hydrofoil as claimed in claim 2, wherein the circular flat float portion of each of the floats has a center, and the connecting portion extends through the center and perpendicularly towards the bottom of the body.

5. The hydrofoil as claimed in claim 2, wherein the float propeller has a shaft, and at the rear edge of the float is provided an assembling seat which is located at a position where a tangent line perpendicular to the bottom of the body touches the arch-shaped section, and the shaft of the float propeller is connected to the assembling seat and parallel to the bottom.

6. The hydrofoil as claimed in claim 1, wherein the front, lower and rear edges of each of the floats are arcs-shaped in cross section, and both ends of the arc-shaped cross section of the front, lower and rear edges are connected to the inner and outer surfaces, the front and rear edges are straight and flat and perpendicular to the bottom of the body, and the lower edge are arc-shaped.

7. The hydrofoil as claimed in claim 1, wherein the front, lower and rear edges of each of the floats are arcs-shaped in cross section, both ends of the arc-shaped cross section of the front, lower and rear edges are connected to the inner and outer surfaces, the front and rear edges are straight and flat and perpendicular to the bottom of the body, the lower edge is inclined and extends downward from the front edge toward the rear edge, and an angle between the lower edge and the bottom of the body ranges from 10 to 30 degrees.

8. The hydrofoil as claimed in claim 1, wherein the front edge of each of the floats has a V-shaped cross section, while the lower and rear edges are arc-shaped in cross section to connect the inner and outer surfaces, the lower edge is inclined and extends downward from the front edge toward the rear edge, and an angle between the lower edge and the bottom of the boat ranges from 10 to 30 degrees.

9. The hydrofoil as claimed in claim 6, wherein the float propeller of each of the floats includes a shaft, at the rear edge of the float is provided an assembling seat which is located adjacent to the lower edge, and the shaft of the float propeller is connected to the assembling seat and parallel to the bottom.

10. The hydrofoil as claimed in claim 1, wherein each of the wings is sheet-shaped and includes a lateral edge located towards the rear end of the body, the at least one wing propeller is disposed at the lateral edge and rotated to adjust an angle of deflection, so as to make the float fly in water with the bottom lifted at a predetermined height from the water.

11. The hydrofoil as claimed in claim 1, wherein each of the wings is wheel-shaped and includes a rim portion and an assembling portion for connecting the rim portion to the body, the at least one wing propeller is disposed in the rim portion and rotated to adjust an angle of deflection, so as to make the float fly in water with the bottom lifted at a predetermined height from the water.

12. The hydrofoil as claimed in claim 1, wherein the number of the floats is four, the four floats are disposed in pairs at the bottom of the body and are located adjacent to the front and rear ends, the number of the wings is four, and the four wings are disposed in pairs at both sides of the body and located adjacent to the front and rear ends.

* * * * *